United States Patent Office 2,897,832
Patented Aug. 4, 1959

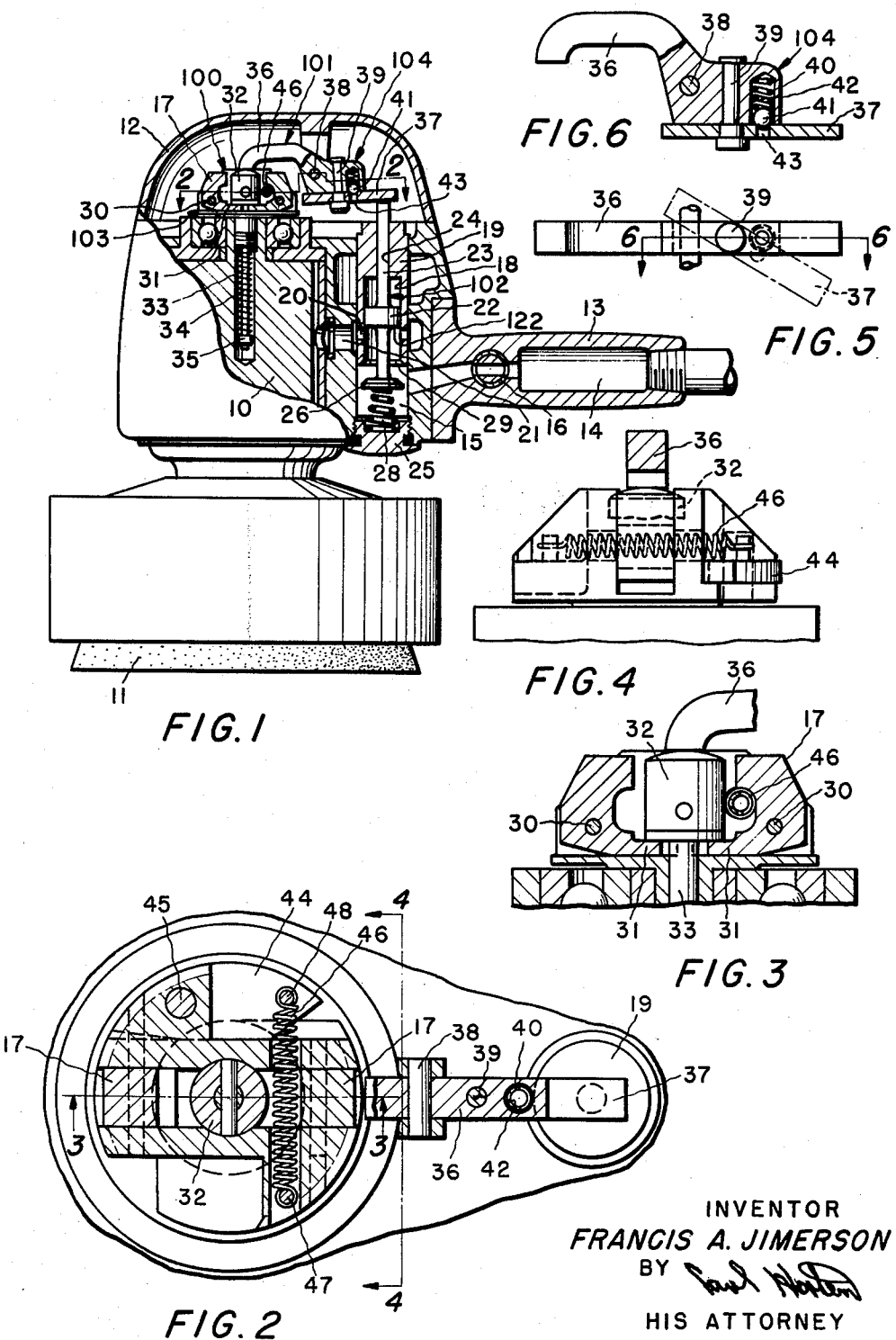

2,897,832

OVERSPEED SAFETY DEVICE

Francis A. Jimerson, Athens, Pa., assignor to Ingersoll-Rand Company, New York, N.Y., a corporation of New Jersey Application December 31, 1956, Serial No. 631,533

4 Claims. (Cl. 137—27)

This invention relates to a safety device for pressure fluid operated motors.

One object is to provide a safety device that automatically cuts off the pressure fluid supply to the motor whenever the motor speed reaches a predetermined rate.

A further object is to provide a safety device which in response to overspeeding cuts off the pressure fluid supply to the motor by effecting a slight change of position of one of the sections of the device without breakage of any part of the device.

Another object of the invention is to prevent the motor from operating at dangerous speeds by providing a safety device responsive to overspeeding which automatically shuts down the motor at dangerous speeds and permits restarting of the motor by manually resetting of a section of the device without disassembling any part of the device.

Other objects will be in part obvious and in part pointed out hereinafter.

Further objects will become apparent from the following specification and drawings in which:

Fig. 1 is a vertical section through a portable grinder of the pneumatic type, provided with a governor constructed in accordance with the practice of the invention.

Fig. 2 is a cross-section through parts of the governor and the safety device, taken along the line 2—2 of Fig. 1 looking in the direction of the arrows.

Fig. 3 is a vertical section through the centrifugally operated weight elements of the governor, taken along the line 3—3 of Fig. 2 looking in the direction of the arrows.

Fig. 4 is a vertical section through the centrifugally operated weight elements of the governor, taken along the line 4—4 of Fig. 2 looking in the direction of the arrows.

Fig. 5 is a top view of Fig. 6 of a member of the safety device for transmitting motion from the governor to the governor and overspeed valves.

Fig. 6 is a partial section through a member of the safety device, taken along the line 6—6 of Fig. 5 looking in the direction of the arrows.

Referring to the drawings the invention is shown adapted to a portable pneumatic grinding machine powered by a pneumatically operated rotary vane type motor 10, housed in the casing 12, for driving a grinding wheel 11. On the side of the casing 12 of the grinding machine is a handle 13 with a passage 14 therethrough for conducting pressure fluid to the motor 10. Air flow through the passage 14 to a supply chamber 15 in the casing 12 is controlled by a valve 16. The supply chamber 15 which is closed at one end by a plug 25 and at the opposite end by a bushing 19, includes a bore 18 in the bushing 19 and is provided with a port 20 leading by way of a passage 21 to the motor 10.

The speed of the motor 10 is controlled by a conventional type centrifugally operated speed governor 100, mounted on and operated by the variations in speed of the motor 10, to raise and lower the head 32. The reciprocating movements of the head 32 are transmitted through a member 101 to the governor valve 102 to regulate the flow of pressure fluid through passage 21 to the motor 10.

The safety device of the invention for preventing the motor from overspeeding includes an overspeed governor 103 adapted to force a section 37 of member 101 out of its locking engagement with a motion locking device 104 and to pivot section 37 slightly around pivot 39 thereby disengaging it from stem 23 whenever the motor overspeeds. As a result thereof the overspeed valve 26 mounted on the stem 23 will be pressed by resilient means, to be explained hereafter, into the closed position cutting off the pressure fluid supply to the motor 10. The aforesaid resilient means shown comprise a pressure surface on the stem 23 and positioned in the bore 18 to be constantly subjected to the force of the pressure fluid when the grinder is operating. A particular embodiment of this invention as illustrated shows the pressure surface 122 situated on the governor valve 22, and the spring 28 is adapted to aid the pressure fluid in moving the overspeed valve 26 into the closed position.

It is clear that, in case the grinder overspeeds and the stem 23 is disengaged from the section 37, the force of the pressure fluid on the pressure surface 122 of the governor valve 102 is adequate for moving the overspeed valve 26 into the closed position. However, the spring 28, installed for keeping the valve in position and for preventing it from falling when the motor is not operating, cooperates in moving the overspeed valve 26 into the cut off position.

The governor valve 102 for the supply of pressure fluid from passage 14 through chamber 15, port 20 and passage 21 to the motor 10, includes a reciprocatory piston like member 22 adapted to overlap the port 20 to increase or decrease the flow of pressure fluid to the motor 10. Said piston like member 22 is mounted on an intermediate portion of the stem 23 extending longitudinally through the opening 24 of bushing 19 and abutting one end of the member 101. The governor valve 102 is adapted to be actuated preferably by a conventional type centrifugally operated speed governor 100 mounted on and operated by variations in speed of the motor 10. The governor 100 includes fly weights 17, each fly weight having an arm 31 which rises as the fly weights 17 move outwardly under influence of the centrifugal force. The arms 31 are adapted to engage the underside of a head 32 mounted on a rod 33 held down by the pressure of a spring 34 mounted around rod 33. A nut 35 is provided on rod 33 to regulate the tension of the spring 34.

A member 101 for transmitting motion from the head 32 of the governor to the valve stem 23 is pivotally mounted on a pivot pin 38 supported by the casing 12 and is rocked about the pivot pin 38 in response to variations in speed of the governor. Said member 101 is so positioned that one end will contact the head 32 of the governor and the other end contacts the free end of the valve stem 23.

In operation, rotation of the governor by the motor causes the fly weights 17 to fly out according to the speed variations of the motor causing the arms 31 of the fly weights to raise or lower head 32. The motion of the head 32 is transmitted through the member 101 to the stem 23 and causes the governor valve 102 to increase or decrease, as the case may be, the supply of pressure fluid to the motor 10 thereby preventing the motor from operating above a predetermined speed.

In view of the fact that the parts for controlling the motor speed may fail to operate effectively so that the motor speed reaches a dangerous rate, the safety device is designed to come into action at a predetermined speed of somewhat higher rate than that at which the motor normally operates. To this end the overspeed valve 26 is provided in the supply chamber 15 and mounted on an end of the stem 23, adapted to seat on the beveled end 29 of bushing 19 for cutting off the pressure fluid supply from passage 14 to motor 10.

The overspeed valve 26 is prevented from moving into the cut off position under the influence of the spring and pressure fluid forces by the member 101. The member 101 consists of a section 37 pivotally clamped to another section 36 by a pivot 39 extending through both sections 36 and 37 and permitting section 37 to pivot in a horizontal plane with respect to section 36. Both sections in the form of the invention illustrated rock around a pivot pin 38 to transmit reciprocating movement of head 32 to the overspeed valve stem 23.

The sections 36 and 37 have a motion locking device 104 for maintaining section 37 in a fixed position in relation with the stem 23 of the governor valve and overspeed valve 26. The motion locking device 104 shown comprises a bore 42 in section 36 radially displaced from the pivot 39 housing the spring 40 and ball 41. The spring 40 constantly forces ball 41 towards the face of section 37 to seat on the edge of a hole 43 having a diameter slightly smaller than the diameter of the ball 41 and drilled in section 37 in the same axis of the bore 42. The seating of the ball 41 on the edge of the hole 43 under the constant force of the spring 40 releasably locks section 37 against movement in respect with section 36.

The means cooperating with the member 101 and the overspeed valve 26 to cut off the pressure fluid supply to the motor in case the motor speed reaches a dangerous rate, includes an overspeed governor, responsive to the motor speed. This governor includes weight element 44 positioned radially outward with respect to the head 32 and adapted to swing outwardly under centrifugal force about a pivot 45 disposed generally parallel to the rod 33, to strike the section 37 of the member 101. The weight element 44 is normally restrained from flying outwardly by a spring 46 attached at one end to pin 48 mounted on the weight element 44 and at the other end to a pin 47 mounted at a point displaced from the weight element 44.

The weight element 44 is movable in the same horizontal plane as section 37 of the member 101 and is so disposed that in the event that the governor valve fails to perform its controlling function and the motor speed exceeds a predetermined safe limit, the weight element 44 will be centrifugally forced outwardly in a path intersecting with the section 37. As a result thereof the weight element 44 will strike the end of section 37 pivoting the section 37 out of the locking engagement with the motion locking device 104. As the section 37 is forced out of its locked position with respect to the section 36 it will also be moved out of its engaging position with the stem 23 of the overspeed valve 26. Consequently, when the section 37 is disengaged from the stem 23, the overspeed valve 26 being free to move upward, will be moved in an upward direction by the force of pressure fluid exerting on the pressure surface 122 on the valve stem 23, until it seats cutting off the supply of the pressure fluid to the motor 10. The spring 28 as explained fully herein before cooperates in moving the overspeed valve 26 into the closed position.

A desirable feature of the safety device is that the section 37 can be reset into its engaging position with the stem 23 of the overspeed valve after it has been forced out of this position by the overspeed governor by simply manually pressing the section 37 into its locking position with the motion locking device 104.

Moreover, the resetting of section 37, in order to restart the motor, can be carried out without breaking or disassembling any part of the device.

While I have shown and described a specific form of my invention, it is to be understood that various changes and modifications may be made without departing from the spirit of the invention as set forth in the appended claims.

I claim:
1. A safety device for a rotating pressure fluid operated motor, the combination of a casing and a reciprocatory overspeed valve therein movable into a position to cut off the pressure fluid supply to the motor, resilient means for constantly urging said overspeed valve into said position whenever the motor is operating, a member holding said overspeed valve against movement in said position and movable into a position to release said overspeed valve, means releasably holding said member against movement into such release position, a centrifugally operated overspeed governor responsive to the speed of the motor and adapted to move said member into such release position to render the member ineffective to hold the overspeed valve such that the aforementioned resilient means moves the overspeed valve into said cutoff position whenever the motor speed exceeds a predetermined limit, said means being manually resettable to its original holding relation with said member solely by return of said member to its original holding position with said overspeed valve.

2. A safety device for a rotating pressure fluid operated motor, the combination of a casing and a reciprocatory governor valve therein for varying the rate of flow of pressure fluid to the motor, a centrifugal speed responsive governor connected to and operated by the motor for actuating the governor valve to regulate the supply of pressure fluid to the motor for preventing the motor from operating above a predetermined speed, an overspeed valve, resilient means constantly urging said overspeed valve into a position to cut off the pressure fluid supply to the motor whenever the motor is operating, a member comprising pivotally connected sections for transmitting actuating motion from the governor to the governor valve and normally holding the overspeed valve from moving into such cut off position, said member having an end of one section cooperating with the governor and an end of the other section engaging the overspeed valve, said member including a spring biased ball and depression arrangement for releasably holding the sections in a fixed position relative to each other, a centrifugally operated overspeed governor responsive to the speed of the motor whenever the motor speed exceeds a predetermined limit to strike one of said sections to change its position with respect to the other section to render the member ineffective to hold the overspeed valve to cause the overspeed valve to be moved by the aforementioned resilient means into such cut off position.

3. A safety device for a rotating pressure fluid operated motor, the combination of a casing and a reciprocatory overspeed valve therein movable into a position to cut off the pressure fluid supply to the motor, resilient means for constantly urging said overspeed valve into said position whenever the motor is operating, a member comprising at least a pair of pivotally connected sections with one section pivotal in a plane substantially transverse to the axis of movement of said overspeed valve and engaging the overspeed valve to hold it against movement into said position, a spring biased ball and depression arrangement mounted in the other section and releasably holding said one section against pivotal movement, a centrifugally operated overspeed governor responsive to the speed of the motor and adapted to strike one of said sections to change its position with respect to the other section to render the member ineffective to hold the overspeed valve such that the aforementioned resilient means moves the overspeed valve into said cut off position whenever the motor speed exceeds a predetermined limit.

4. A safety device for a rotating pressure fluid operated motor, the combination of a casing and a reciprocatory overspeed valve therein movable into a position to cut off the pressure fluid supply to the motor, resilient means for constantly urging said overspeed valve into said position whenever the motor is operating, a member comprising at least a pair of pivotally connected sections with one section engaging the overspeed valve to hold it against movement into said position, a centrifugally operated overspeed governor responsive to the speed of the motor and adapted to strike one of said sections to change its position with respect to the other section to render the member ineffective to hold the overspeed valve such that the aforementioned resilient means moves the overspeed valve into said cut off position whenever the motor speed exceeds a predetermined limit, said means comprising a spring biased ball and depression arrangement which permits this section engaging the overspeed valve to be forced out of the engaging position with the overspeed valve by the overspeed governor and permits the last said section to be manually re-engaged with the overspeed valve to restart the motor without disassembling any part of said device.

References Cited in the file of this patent
UNITED STATES PATENTS

| | | |
|---|---|---|
| 1,584,358 | Dement | May 11, 1926 |
| 2,422,733 | Jimerson | June 24, 1947 |
| 2,553,466 | Morgan | May 15, 1951 |
| 2,586,968 | Maclay | Feb. 26, 1952 |